United States Patent
Niewiadomski et al.

(10) Patent No.: US 11,155,133 B2
(45) Date of Patent: Oct. 26, 2021

(54) SYSTEM AND METHODS FOR VEHICLE ALIGNMENT CONTROL

(71) Applicant: Ford Global Technologies, LLC, Dearborn, MI (US)

(72) Inventors: Luke Niewiadomski, Dearborn, MI (US); Eric L. Reed, Livonia, MI (US); Roger Arnold Trombley, Ann Arbor, MI (US); Robert D. Klosek, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 16/266,703

(22) Filed: Feb. 4, 2019

(65) Prior Publication Data

US 2020/0247197 A1   Aug. 6, 2020

(51) Int. Cl.
*B60D 1/36* (2006.01)
*B60T 8/172* (2006.01)
*B60D 1/24* (2006.01)

(52) U.S. Cl.
CPC ............. *B60D 1/366* (2013.01); *B60D 1/242* (2013.01); *B60T 8/172* (2013.01); *B60T 2230/08* (2013.01)

(58) Field of Classification Search
CPC .......... B60D 1/242; B60D 1/366; B60D 1/36; B60D 1/62; B60T 2230/08; B60T 8/172; B60T 8/1708
See application file for complete search history.

(56) References Cited

U.S. PATENT DOCUMENTS

| | | | |
|---|---|---|---|
| 6,516,925 B1 * | 2/2003 | Napier | B60T 1/10 188/112 A |
| 9,102,271 B2 | 8/2015 | Trombley et al. | |
| 9,434,381 B2 | 9/2016 | Windeler | |
| 9,457,632 B1 * | 10/2016 | Windeler | B60D 1/36 |
| 9,499,018 B2 | 11/2016 | Gehrke et al. | |
| 9,914,333 B2 | 3/2018 | Shank et al. | |
| 2005/0246081 A1 | 11/2005 | Bonnet et al. | |
| 2015/0081184 A1 * | 3/2015 | Braunberger | B60T 7/20 701/70 |
| 2016/0101765 A1 * | 4/2016 | Reed | B60T 8/171 701/70 |
| 2016/0272024 A1 | 9/2016 | Bochenek et al. | |
| 2017/0254873 A1 * | 9/2017 | Koravadi | G01S 19/45 |
| 2018/0215382 A1 * | 8/2018 | Gupta | G05D 1/0214 |
| 2018/0312022 A1 | 11/2018 | Mattern et al. | |

* cited by examiner

*Primary Examiner* — Behrang Badii
*Assistant Examiner* — Daniel L Greene
(74) *Attorney, Agent, or Firm* — Raymond Coppiellie; Price Heneveld LLP

(57) ABSTRACT

A vehicle control system comprises a sensor configured to capture sensor data and a controller configured to identify a coupler position of a trailer in the sensor data. The controller is further configured to control a vehicle alignment routine aligning the hitch with the coupler position and control an emergency braking operation in response to detecting an obstruction in the sensor data. The controller is configured to suppress the emergency braking operation in response to the obstruction corresponding to the coupler in the sensor data.

15 Claims, 7 Drawing Sheets

SYSTEM AND METHODS FOR VEHICLE ALIGNMENT CONTROL

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle control system is disclosed. The system comprises a sensor configured to capture sensor data and a controller configured to identify a coupler position of a trailer in the sensor data. The controller is further configured to control a vehicle alignment routine aligning the hitch with the coupler position and control an emergency braking operation in response to detecting an obstruction in the sensor data. The controller is configured to suppress the emergency braking operation in response to the obstruction corresponding to the coupler in the sensor data.

Embodiments of the first aspect of the disclosure can include any one or a combination of the following features:
  the emergency braking operation is activated in response to a speed of the vehicle exceeding an activation threshold;
  the suppression of the emergency braking operation comprises controlling the motion of the vehicle at the speed less than the activation threshold;
  the controlling motion of the vehicle aligning the hitch with the coupler position comprises stopping the vehicle via an alignment braking operation;
  the controller is configured to control a brake system such that the emergency braking operation comprises a greater rate of deceleration than the alignment braking operation;
  the coupler position is identified as the coupler in connection with the trailer in the sensor data;
  the suppression of the emergency braking operation comprises omitting the coupler and/or the trailer from being identified as the obstruction in the sensor data;
  the suppression is in response to a combination of the detection of the coupler and the trailer, and the processing of the vehicle alignment routine; and/or
  the suppression of the emergency braking operation comprises deactivating the emergency braking operation in response to the vehicle alignment routine.

According to another aspect of the present disclosure, a method for controlling a vehicle alignment is disclosed. The method comprises identifying a coupler position of a trailer in the sensor data and controlling motion of the vehicle to an aligned position aligning the hitch ball with the coupler position. The method further comprises controlling an emergency braking operation in response to detecting an obstruction in the sensor data and suppressing the emergency braking operation in response to the obstruction corresponding to the coupler in the sensor data.

Embodiments of the additional aspects of the disclosure can include any one or a combination of the following features:
  the emergency braking operation is activated in response to a speed of the vehicle exceeding an activation threshold;
  the suppressing of the emergency braking operation comprises controlling the motion of the vehicle at the speed less than the activation threshold;
  the coupler position is identified as the coupler in connection with the trailer in the sensor data;
  suppressing the emergency braking operation comprises omitting the coupler and the trailer from being identified as the obstruction in the sensor data;
  suppressing the emergency braking operation is in response to a combination of the detection of the coupler and the trailer, and the processing of the vehicle alignment routine; and/or
  suppressing the emergency braking operation comprises deactivating the emergency braking operation in response to the vehicle alignment routine.

According to another aspect of the present disclosure, a vehicle system configured to control a trailer alignment routine is disclosed. The system comprises a hitch mounted on a vehicle and a sensor configured to detect sensor data in a region proximate to the vehicle. A controller is configured to identify a coupler position of a coupler in connection with a trailer in the sensor data and control motion of the vehicle along a vehicle heading to an aligned position. The aligned position comprises the hitch aligned with the coupler. The controller is further configured to control an emergency braking operation in response to detecting an obstruction in the sensor data and suppress the emergency braking operation in response to the obstruction corresponding to the coupler in connection with the trailer.

Embodiments of the additional aspects of the disclosure can include any one or a combination of the following features:
  the suppression of the emergency braking operation comprises omitting the coupler and the trailer from being identified as the obstruction in the sensor data;
  the suppression is in response to a combination of the detection of the coupler and the trailer and the processing of the vehicle alignment routine; and/or
  the emergency braking operation is activated in response to a speed of the vehicle exceeding an activation threshold and the suppression of the emergency braking operation comprises controlling the motion of the vehicle at the speed less than the activation threshold.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
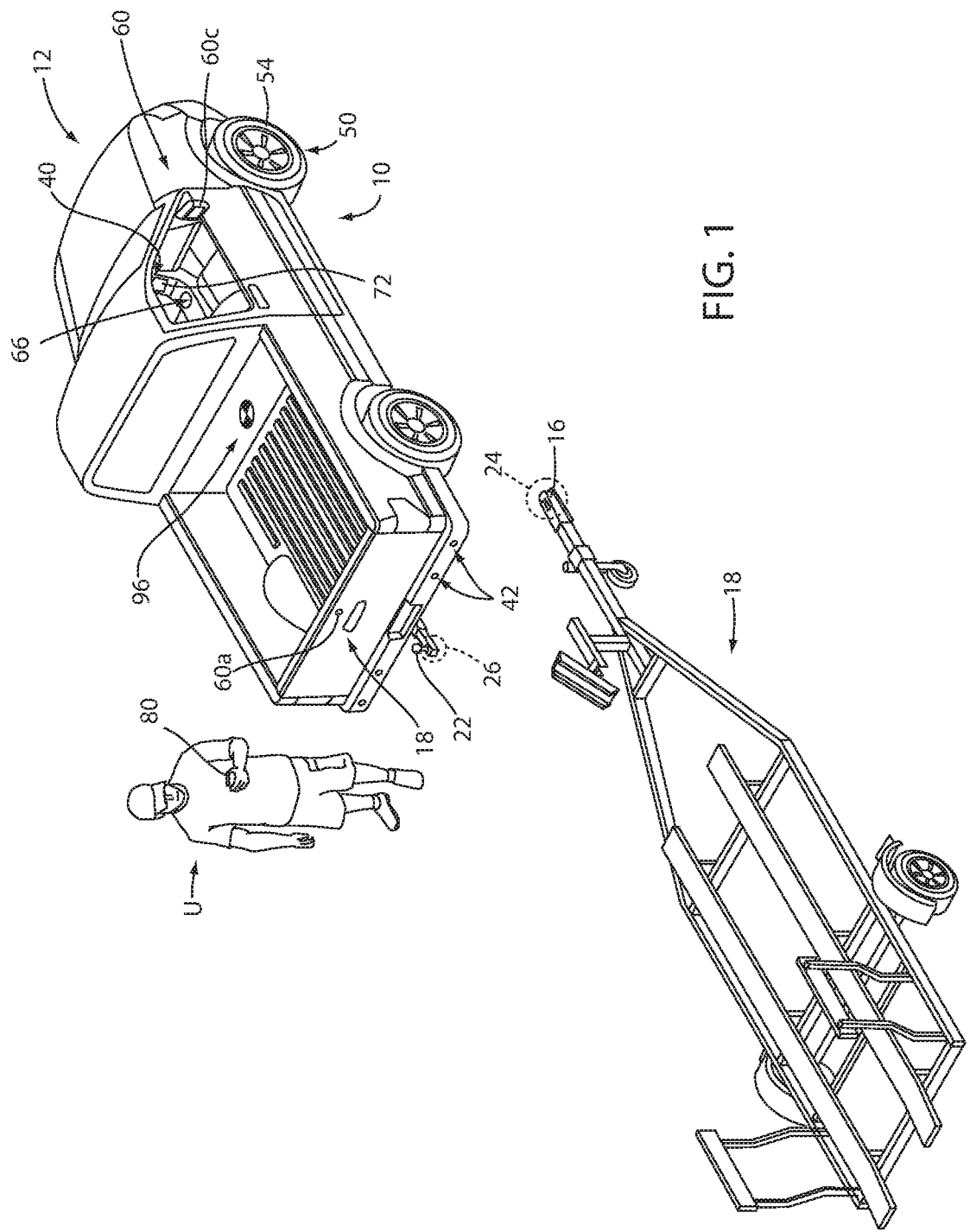
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to operate in combination with additional vehicle systems. For example, the system 10 may be configured to operate in combination with an automatic braking system. The automatic braking system may be configured to detect one or more obstructions that are in the path 20 of the vehicle and activate an emergency braking routine in response to the detection. However, such operation may interfere with the navigation toward the coupler position 24. Accordingly, as further discussed in reference to FIGS. 5-7, the system 10 may be integrated or operate in concert with the automatic braking system in a variety of ways to ensure that the system operates effectively to both navigate toward targets (e.g. the coupler 16) and prevent collisions with obstructions.

Figure 2:
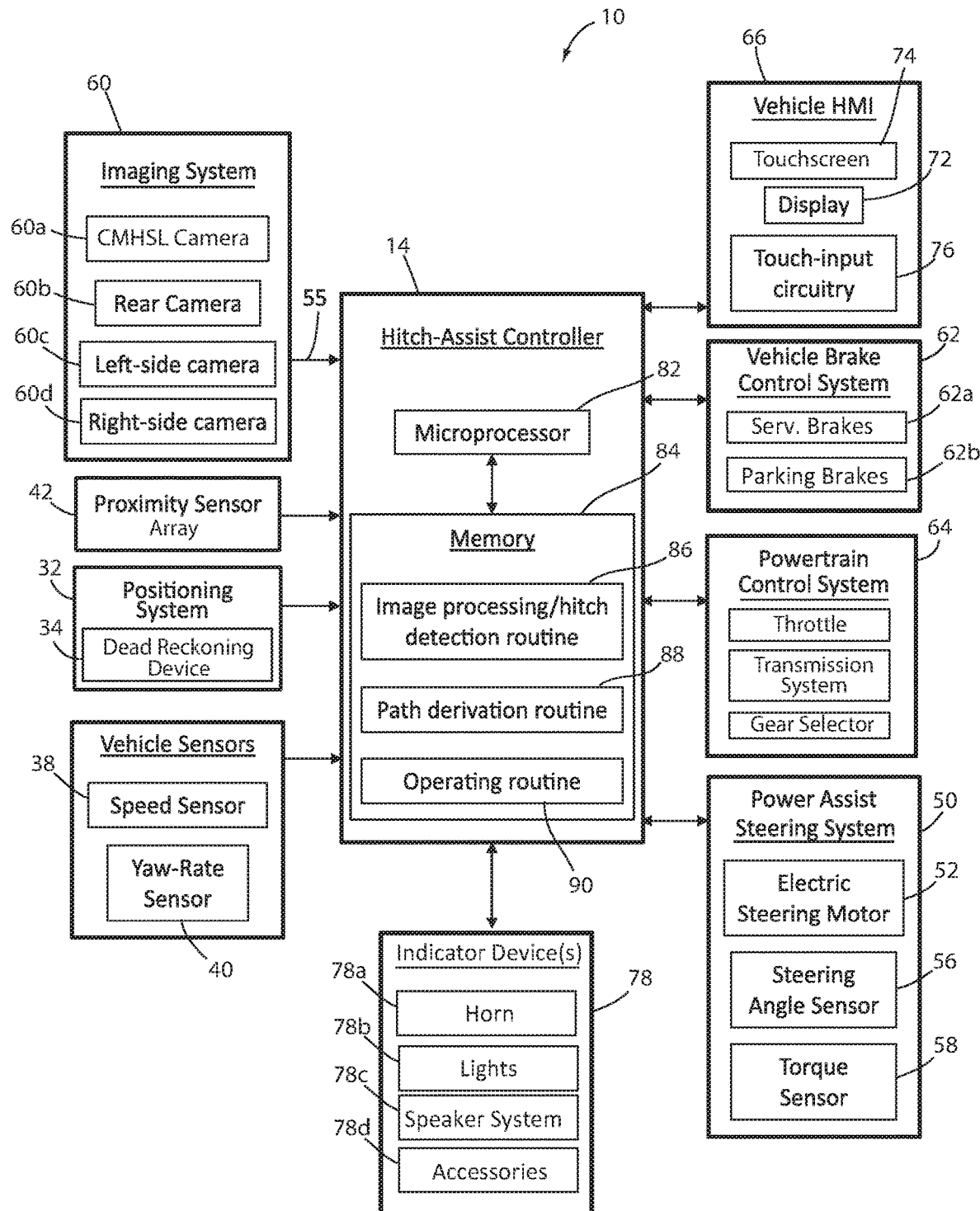
FIG. 2 is a diagram of a system according to an aspect of the disclosure for assisting in aligning the vehicle with a trailer in a position for hitching the trailer to the vehicle.
Figure 3:
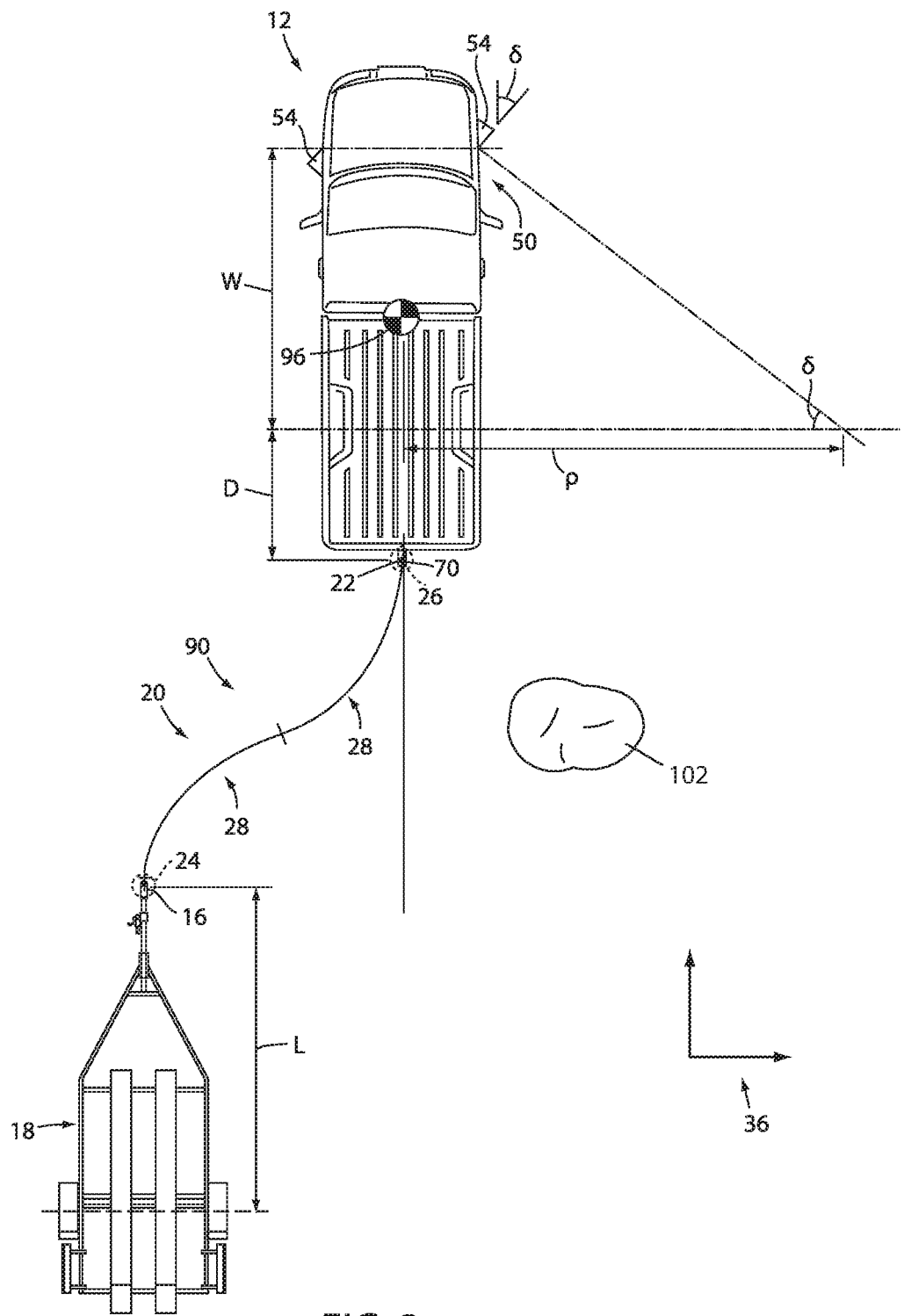
FIG. 3 is a plan view of a vehicle during a step of the alignment sequence with the trailer.
Figure 4:
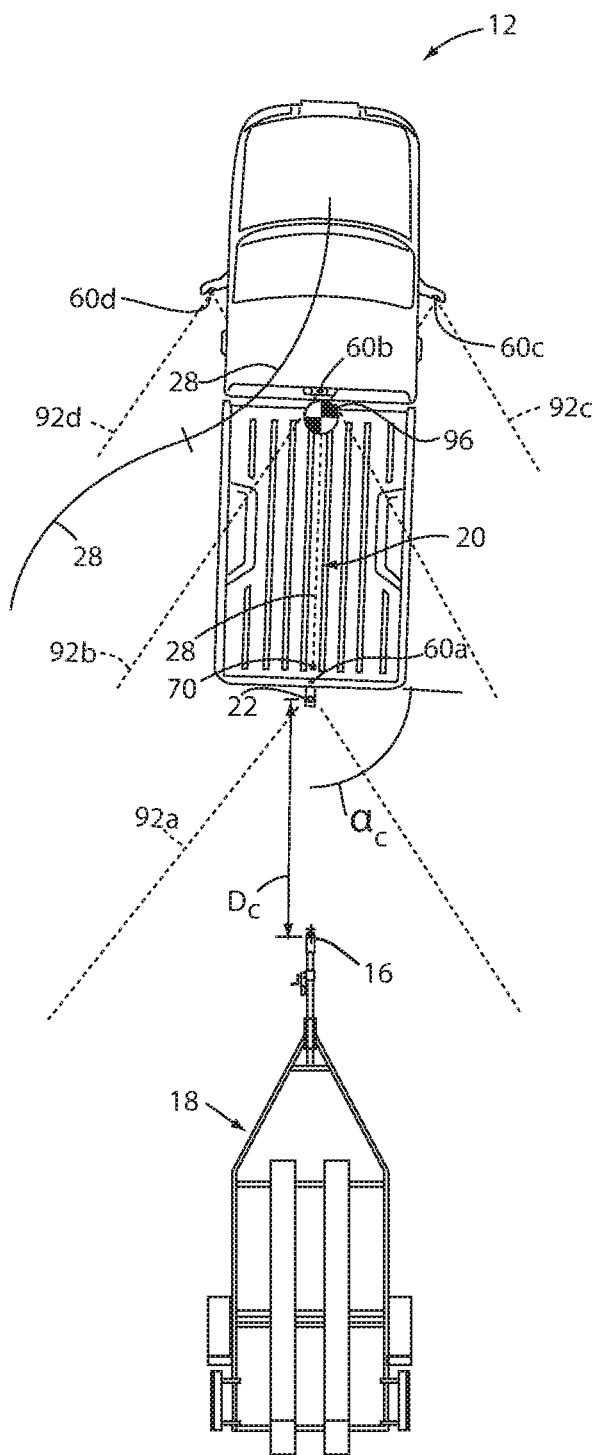
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62*a* and a parking brake 62*b*. The parking brake 62*b* may correspond to an electronic parking brake system that may be in communication with the controller 14. Accordingly in operation, the controller 14 may be configured to control the brakes 62*a* and 62*b* as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. In some embodiments, the brake control system 62 may additionally and/or alternatively be configured to control an emergency braking routine. For example, in response to detecting an obstruction along the path 20 of the vehicle 12, the controller 14 may be configured to control the operation of the system 10 to stop the vehicle and/or issue an alert signal. The alert signal may correspond to a notification of an actual, impending, and/or anticipated collision with an obstruction and/or a portion of trailer 18. As further discussed in reference to FIGS. 5-7, the system 10 may be configured to operate such that the emergency braking operation does not prevent the controller 14 from successfully navigating the vehicle such that the hitch ball 22 is aligned with the coupler 16.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78*a*, lights 78*b*, a speaker system 78*c*, vehicle accessories 78*d*, etc. In some embodiments, the indicator devices 78 may further include one or more accessories 78*d*, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. Pat. App. Publication No. 2018/0312022 A1, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius p for vehicle 12 according to the equation:

$$\rho = \frac{1}{W \tan \delta} \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
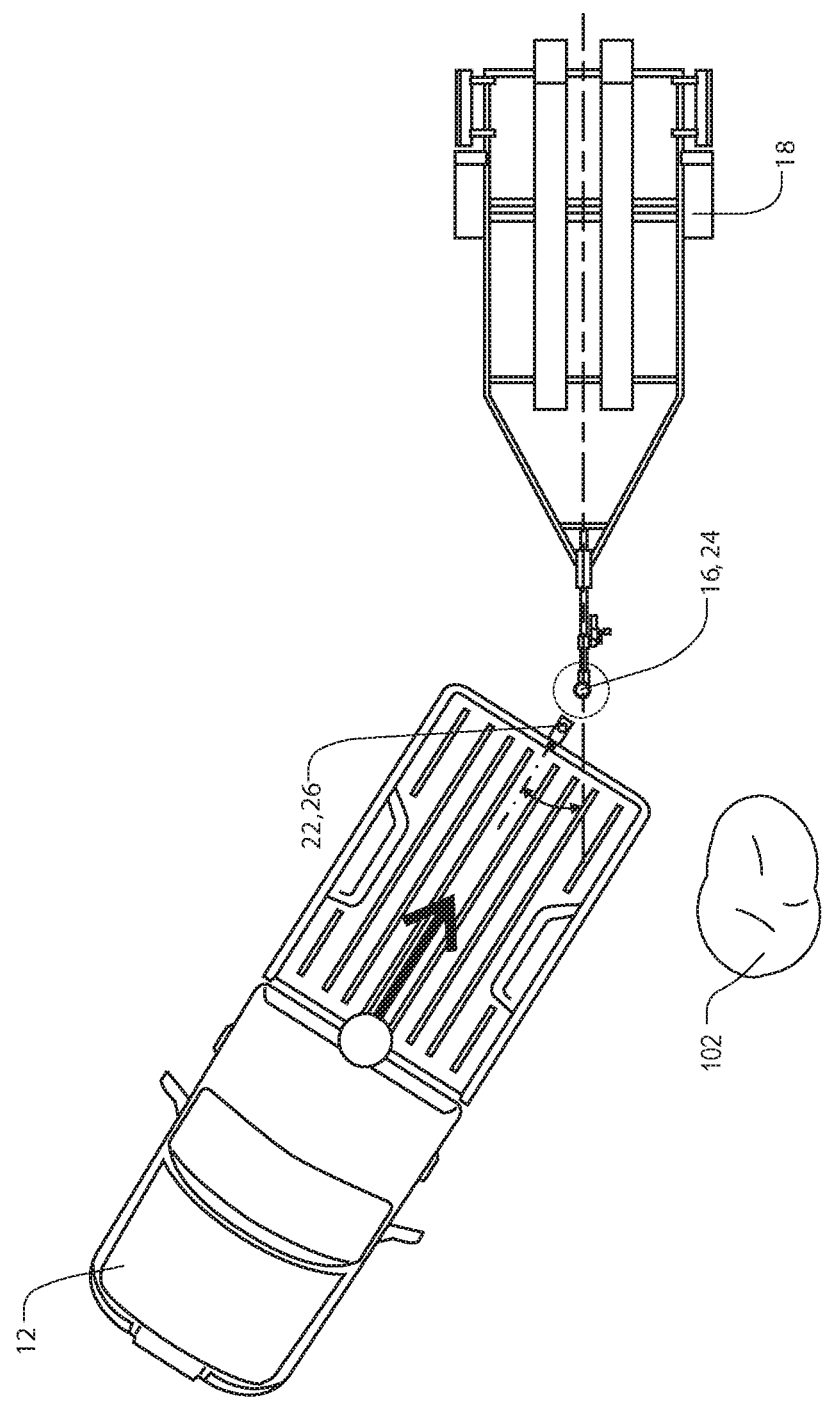
FIG. 5 is a plan view of a vehicle controlling the alignment sequence with the trailer demonstrating an obstruction.

Referring now to FIGS. 3 and 5, in some embodiments, system 10 may be configured to identify an obstruction 102 in the image data via the image processing routine 86. The coupler 16 and the trailer 18 may be distinguished from obstructions 102 by the controller 14 by detecting one or more identifying characteristics of a marker displayed on the coupler 16 and/or the trailer 18. Similarly, the coupler 16 and the trailer 18 may be identified in the image data based on an image processing algorithm (deep learning convolutional neural network, character or shape recognition, edge detection, etc.). In this way, the controller 14 may distinguish the coupler 16 and trailer 18 from the obstruction 102 such that the system may accurately maneuver the vehicle 12 to align the hitch ball 22 with the coupler 16 without the maneuvering being interfered with or prevented by the activation of the emergency braking routine. That is, due to the precise operation required to accurately position the hitch ball 22 in alignment with the coupler 16, the system 10 may suppress the operation of the emergency braking routine to prevent interference with the alignment operations discussed herein.

In operation, in response to the successful identification of the trailer 18 and the coupler 16, the controller 14 may be operable to distinguish the obstruction 102 from the target (e.g. the coupler 16) to generate the path 20 and control the operation of the emergency braking routine of the brake control system 62. As previously discussed, in some embodiments, the controller 14 may seek a confirmation of the coupler 16 and one or more obstructions in the detected image data via a prompt on touchscreen 74. In this way, the system 10 may be configured to distinguish or assign the identity of the coupler 16 and one or more of the obstructions 102 to prevent errors such as prematurely stopping the vehicle 12 when approaching the coupler 16 or misidentifying the obstruction at the coupler 16.

Figure 6:
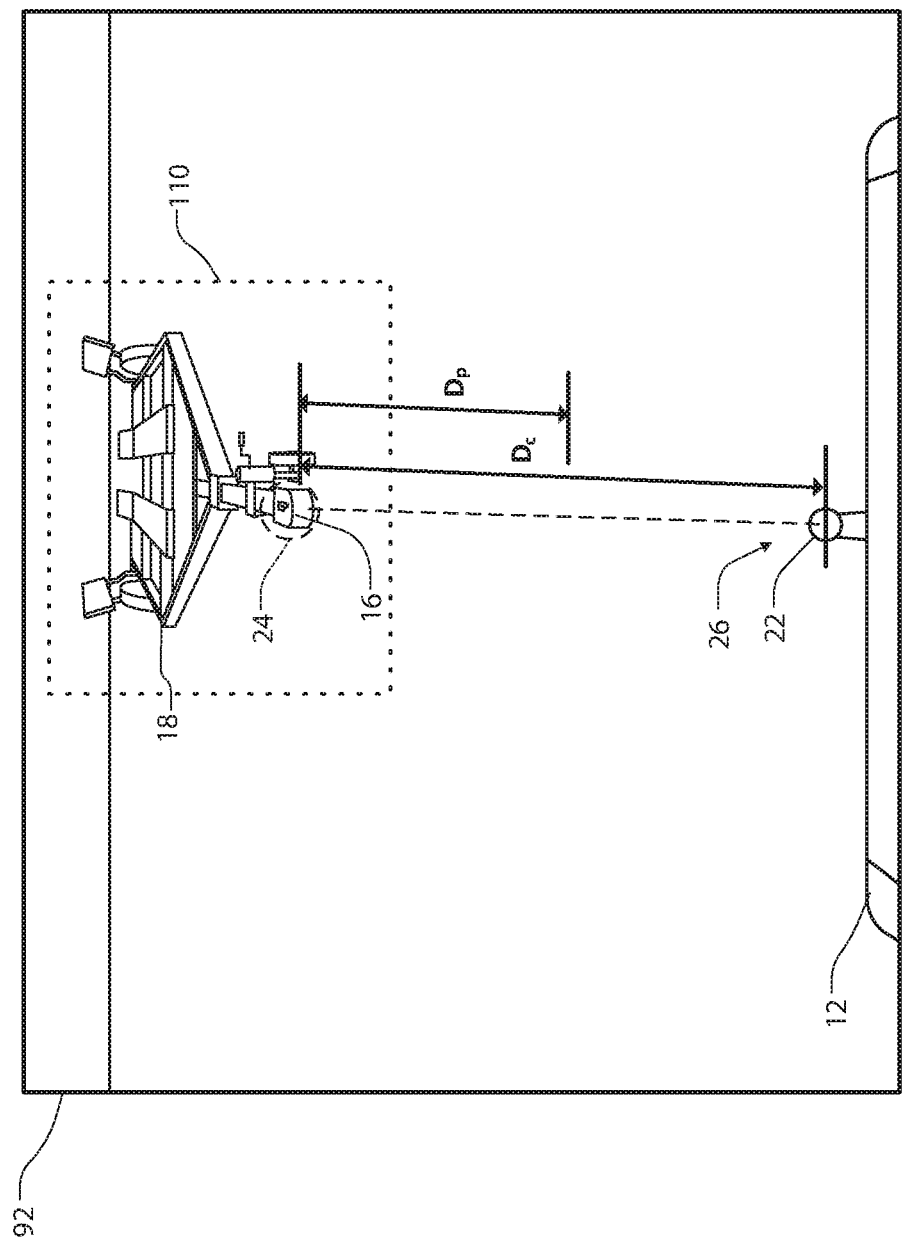
FIG. 6 is a projected view of a coupler of a trailer demonstrating a predetermined distance where an emergency braking routine may be altered to prevent interruption of an alignment routine.

FIG. 6 demonstrates a projected view of image data captured by one or more of the cameras 60a-d in the fields of view 92 as discussed herein. Referring now to FIG. 6, the system 10 may be configured to identify a region 110 in which the trailer 18 and the coupler 16 are located in the image data. Once the region 110 is identified by the controller 14, the controller 14 may display the region 110 on the touch screen 74 and request a verification that the region 110 and/or the coupler position 24 is accurately identified in the image data. In this way, the system 10 may distinguish the obstruction as previously discussed from the coupler 16 and the trailer 18. In this way, the system 10 may suppress the activation of the emergency braking routine of the brake control system 62 when approaching the coupler 16.

In some implementations, the controller 14 may also or alternatively suppress the emergency braking routine by controlling the operation of the maneuvering of the vehicle to prevent the activation of the emergency braking routine. For example, in response to the distance $D_c$ to coupler 16 being less than a predetermined distance $D_p$ (e.g. 0.5 m to 3 m), the system 10 may deactivate or temporarily suppress the operation of the emergency braking routine. The suppression of the emergency braking routine may prevent the unwanted triggering of an emergency braking event within the predetermined distance $D_p$. In this configuration, the system 10 may be operable to activate the emergency braking routine in response to the identification of the obstruction 102 and may also be prevented from interrupting the alignment of the hitch ball 22 with the coupler 16.

The suppression of the emergency braking routine may similarly be accomplished by controlling the motion of the vehicle 12 outside of an activation range of the emergency braking routine. For example, the controller 14 may be configured to activate the emergency braking routine only if a speed of the vehicle 12 is in excess of a predetermined speed (e.g. 0.1-3 meters per second). In this way, the operation of the emergency braking operation may be deactivated or suppressed by limiting a speed of the vehicle 12. According, by controlling the motion of the vehicle with the brake control system 62 powertrain control system 64, the controller 14 may bypass the activation of the emergency braking routine under limited circumstances. In this way, the system 10 may also provide for the combined operation of the alignment or operating routine 90 while providing the benefits of the emergency braking routine.

Figure 7:
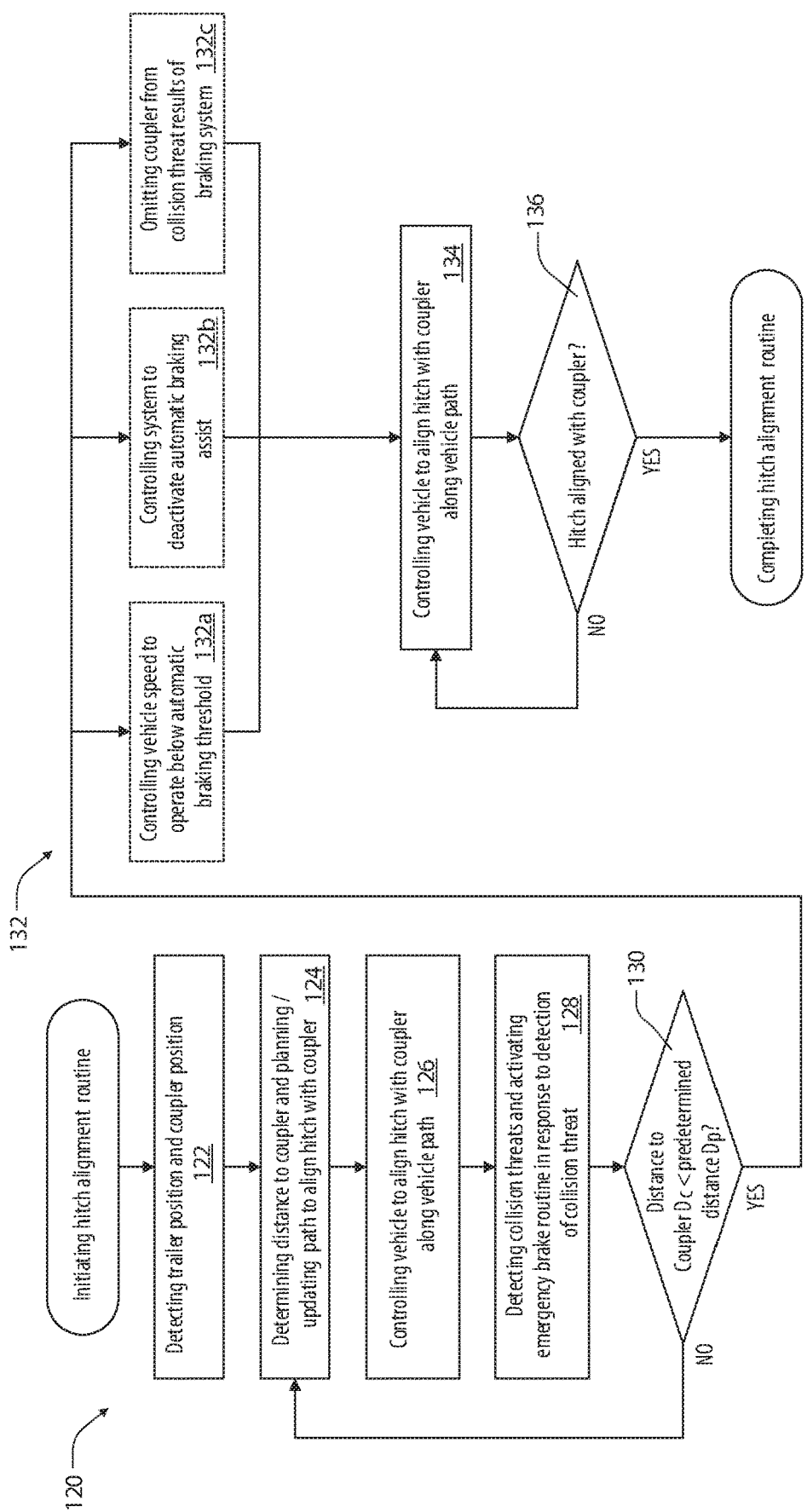
FIG. 7 is a flow chart demonstrating a method for aligning a vehicle hitch with a trailer coupler such that the alignment may not be interrupted by a potential collision detection in accordance with the disclosure.

Referring now to FIG. 7, a flow chart demonstrating a method 120 to align the hitch ball 22 with the coupler 16 is shown. As discussed herein, the method 120 may provide for the operation of the controller 14 controlling the operating routine 90 while maintaining a limited operation of the emergency braking routine as discussed herein. The method 120 may begin by detecting the coupler position 24 of the coupler 16 in connection with the trailer 18 (122). Once the coupler position 24 is determined, the controller 14 may continue to identify the path 20 of the vehicle 12 based on the path derivation routine 88 (124). Once the path is identified, the controller 14 may control the system 10 to maneuver the vehicle 12 along the path 20 (126). While maneuvering the vehicle 12, the controller 14 may detect objects or the obstruction 102 and activate the emergency braking routine in response to the detection of objects that may present a threat of collision in the path 20 (128). In this way, the system 10 may provide for the emergency braking routine to prevent collisions.

As previously discussed, the system may adjust the operation of the controller 14 in relation to the collision detection monitoring to prevent interference with the alignment of the hitch ball 22 and the coupler 16 by the emergency braking routine. For example, the controller 14 may monitor the distance $D_c$ to the coupler 16 to determine if it is less than the predetermined distance $D_p$ (e.g. 0.5 m to 5 m) (130). If the distance $D_c$ to the coupler 16 is greater than the predetermined distance $D_p$, the controller 14 may return to step 124. If the distance $D_c$ to the coupler 16 is less than the predetermined distance $D_p$, the controller 14 may activate one or more operations to suppress or limit the activation of the emergency braking routine (132). In this way, the controller 14 may provide for the emergency braking routine and the alignment routine to each be implemented by the system 10 without interference.

As demonstrated in step 132a, the controller 14 may suppress the activation of the emergency braking routine by controlling the motion of the vehicle 12 outside of an activation range of the emergency braking routine. For example, the controller 14 may be configured to activate the emergency braking routine only if a speed of the vehicle 12 is in excess of a predetermined speed (e.g. 0.1-3 meters per second). By controlling the motion of the vehicle 12 with the brake control system 62 and powertrain control system 64, the controller 14 may bypass the activation of the emergency braking routine under limited circumstances. In this way, the system 10 may also provide for the combined operation of the alignment or operating routine 90 while providing the benefits of the emergency braking routine.

As demonstrated in step 132b, the controller 14 may deactivate the emergency braking routine of the brake control system 62 in response to the distance $D_c$ to the coupler 16 is less than the predetermined distance $D_p$. In such cases, the emergency braking routine may be deactivated when the predetermined distance $D_p$ is sufficiently small that there is little to no chance that an intervening object may interfere with the alignment of the hitch ball 22 with the coupler 16. In this configuration, the system 10 may similarly provide for the combined operation of the alignment or operating routine 90 while providing the benefits of the emergency braking routine.

As described in reference to step 132c, the controller 14 may identify the trailer 18 and/or the coupler 16 in image data or scanning data. Similarly, the controller 14 may prompt the user U of the system 10 to identify the trailer 18 and/or the coupler 16. In response to the identification of the trailer 18 and/or the coupler 16, the controller 14 may designate that the trailer 18 is not an obstruction. Accordingly, the detection of the trailer 18 and/or the coupler may be suppressed from identification as the obstruction 102 in the image or scanning data. Accordingly, based on the identification of the trailer 18 and/or the coupler 16, the controller 14 may suppress the emergency stopping routine of the system 10 to prevent interference with the alignment of the hitch ball 22 with the coupler 16.

Following step 132, the controller 14 may continue to control the system 10 to maneuver the vehicle 12 along the path 20 (134). While maneuvering the vehicle 12, the controller 14 may control the powertrain control system 64 and brake control system 62 to align the hitch ball 22 with the coupler 16. In step 136, the controller 14 may monitor the hitch position 26 in reference to the coupler position to determine if the hitch ball 22 is aligned with the coupler 16. If the hitch ball 22 is not aligned with the coupler 16, the controller 14 may return to step 134. If the hitch ball 22 is aligned with the coupler 16, the controller 14 may complete the alignment routine. In this way, the system may provide for the implementation of an emergency braking routine with the alignment routine of the hitch ball with the coupler 16.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle control system comprising:
a sensor configured to capture sensor data; and
a controller that:
identifies a plurality of collision threats comprising a first obstruction and a second obstruction in the sensor data;
determines the first obstruction of the plurality of collision threats to be a coupler of a trailer in response to one or more identifying characteristics of the trailer in the sensor data;
identifies a coupler position of the coupler of the trailer in the sensor data;
controls a vehicle alignment routine aligning the hitch with the coupler position along an alignment path;
controls an emergency braking operation in response to detecting the second obstruction in the sensor data along the alignment path; and
suppresses the emergency braking operation in response to the first obstruction based on the determination that the first obstruction is the coupler.

2. The vehicle control system according to claim 1, wherein the emergency braking operation is activated in response to a speed of the vehicle exceeding an activation threshold.

3. The vehicle control system according to claim 2, wherein the suppression of the emergency braking operation comprises controlling the motion of the vehicle at the speed less than the activation threshold.

4. The vehicle control system according to claim 1, wherein the controlling motion of the vehicle aligning the hitch with the coupler position comprises stopping the vehicle via an alignment braking operation.

5. The vehicle control system according to claim 4, wherein the controller controls a brake system such that the emergency braking operation comprises a greater rate of deceleration than the alignment braking operation.

6. The vehicle control system according to claim 1, wherein the coupler position is identified as the coupler in connection with the trailer in the sensor data.

7. The vehicle control system according to claim 6, wherein the suppression of the emergency braking operation comprises omitting the coupler and the trailer from being identified as the first obstruction in the sensor data.

8. A method for controlling a vehicle alignment comprising:
identifying a plurality of collision threats comprising a first obstruction and a second obstruction in sensor data;
determine the first obstruction of the plurality of collision threats to be a coupler of a trailer in response to one or more identifying characteristics of the trailer in the sensor data;
identifying a coupler position of the coupler of the trailer in the sensor data;
controlling motion of the vehicle to an aligned position aligning the hitch ball with the coupler position along an alignment path;
controlling an emergency braking operation in response to detecting the second obstruction in the sensor data; and
suppressing the emergency braking operation in response to the first obstruction based on the determination that the first obstruction is the coupler.

9. The method according to claim 8, wherein the emergency braking operation is activated in response to a speed of the vehicle exceeding an activation threshold.

10. The method according to claim 9, wherein the suppressing of the emergency braking operation comprises controlling the motion of the vehicle at the speed less than the activation threshold.

11. The method according to claim 8, wherein the coupler position is identified as the coupler in connection with the trailer in the sensor data.

12. The method according to claim 11, wherein suppressing the emergency braking operation comprises omitting the coupler and the trailer from being identified as the first obstruction in the sensor data.

13. A vehicle system configured to control a trailer alignment routine, comprising:
a hitch mounted on a vehicle;
a sensor configured to detect sensor data in a region proximate to the vehicle; and
a controller that:
identifies a coupler position of a coupler in connection with a trailer in the sensor data;
controls motion of the vehicle along a vehicle heading to an aligned position, wherein the hitch is aligned with the coupler;
controls an emergency braking operation in response to detecting an obstruction in the sensor data; and
suppresses the emergency braking operation in response to the obstruction corresponding to the coupler in connection with the trailer, wherein the suppression of the emergency braking operation comprises omitting at least one of the coupler and the trailer from being identified as the obstruction in the sensor data.

14. The vehicle control system according to claim 13, wherein the suppression is in response to a combination of:
the detection of the coupler and the trailer; and
the processing of the vehicle alignment routine.

15. The vehicle control system according to claim 13, wherein the emergency braking operation is activated in response to a speed of the vehicle exceeding an activation threshold and the suppression of the emergency braking operation comprises controlling the motion of the vehicle at the speed less than the activation threshold.

* * * * *